(12) United States Patent
Konrad

(10) Patent No.: US 11,047,591 B2
(45) Date of Patent: Jun. 29, 2021

(54) ACTUATOR

(71) Applicant: Siemens Schweiz AG, Zurich (CH)

(72) Inventor: Hilmar Konrad, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 234 days.

(21) Appl. No.: 16/410,113

(22) Filed: May 13, 2019

(65) Prior Publication Data

US 2019/0346174 A1  Nov. 14, 2019

(30) Foreign Application Priority Data

May 14, 2018 (EP) .................................... 18172183

(51) Int. Cl.
*F24F 13/14* (2006.01)
*F16H 35/00* (2006.01)

(52) U.S. Cl.
CPC .... *F24F 13/1426* (2013.01); *F16H 2035/003* (2013.01); *F24F 2013/1446* (2013.01)

(58) Field of Classification Search
CPC ........ F16H 2035/003; F24F 2013/1446; F24F 13/1426
See application file for complete search history.

(56) References Cited

U.S. PATENT DOCUMENTS

| 844,210 | A | * | 2/1907 | Strickland | ......... | F16H 2035/003 |
| | | | | | | 74/437 |
| 1,142,051 | A | * | 6/1915 | O'Connor | ......... | F16H 2035/003 |
| | | | | | | 74/437 |
| 2,477,441 | A | * | 7/1949 | Cole | .................... | A63H 33/042 |
| | | | | | | 434/401 |
| 3,098,399 | A | * | 7/1963 | Berthiaume | .......... | F16H 19/001 |
| | | | | | | 74/366 |
| 4,685,348 | A | * | 8/1987 | Takami | ................... | F16H 35/02 |
| | | | | | | 74/393 |
| 4,838,226 | A | * | 6/1989 | Matsuzawa | ............. | F02D 11/04 |
| | | | | | | 123/361 |

(Continued)

FOREIGN PATENT DOCUMENTS

| DE | 2618715 A1 | * | 11/1977 | ............. | F16H 35/02 |
| DE | 20 2014 102 355 U1 | | 7/2014 | ............. | F16H 35/08 |
| GB | 2 388 177 A | | 11/2003 | ............. | F16K 31/04 |

*Primary Examiner* — Terence Boes
(74) *Attorney, Agent, or Firm* — Slayden Grubert Beard PLLC

(57) ABSTRACT

Various embodiments include an actuator comprising: a drive element; a transmission section; an actuating element; a mechanically active connection from the drive element to the actuating element through the transmission section; and a reset spring providing a closing force acting on the actuating element. The transmission section includes a drive gear wheel, a transmission gear wheel, and a take-off gear wheel. The transmission gear wheel includes a drive gear section and a take-off gear section. There is a first meshed engagement from the drive gear section through a first transmission function into the drive gear wheel and a second meshed engagement from the take-off gear section through a second transmission function into the take-off gear wheel. The first transmission function and the second transmission function are different. The drive gear wheel, the drive gear section, the take-off gear section, and the take-off gear wheel are arranged in one active plane.

13 Claims, 3 Drawing Sheets

(56) References Cited

U.S. PATENT DOCUMENTS

| | | | |
|---|---|---|---|
| 2005/0009661 A1* | 1/2005 | Kerr | F16H 29/00 475/203 |
| 2014/0000550 A1* | 1/2014 | Taylor | F02B 75/265 123/197.1 |
| 2016/0033024 A1* | 2/2016 | Yulkowski | E05F 15/53 49/335 |
| 2019/0346059 A1* | 11/2019 | Konrad | F16H 33/02 |

* cited by examiner

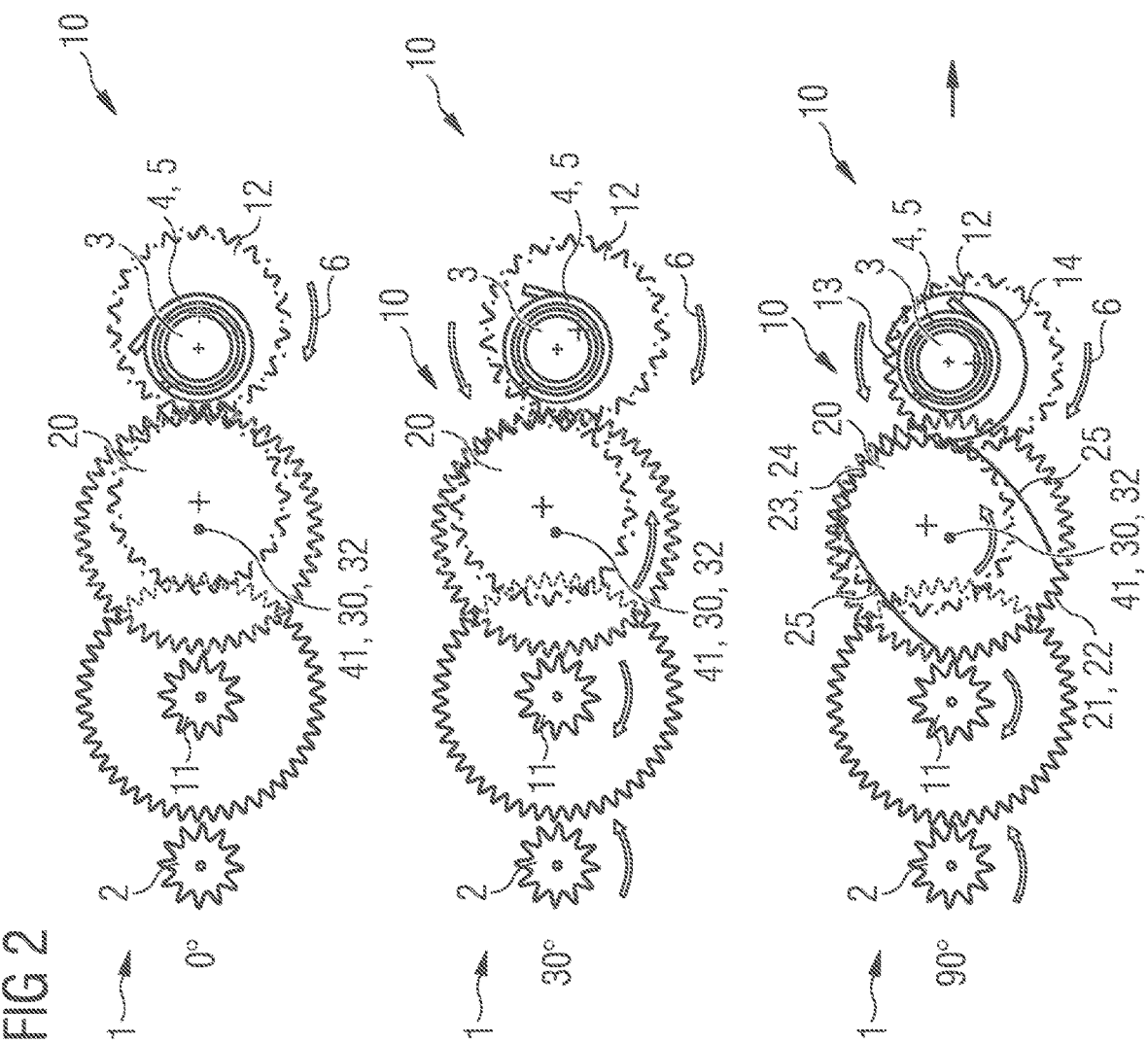
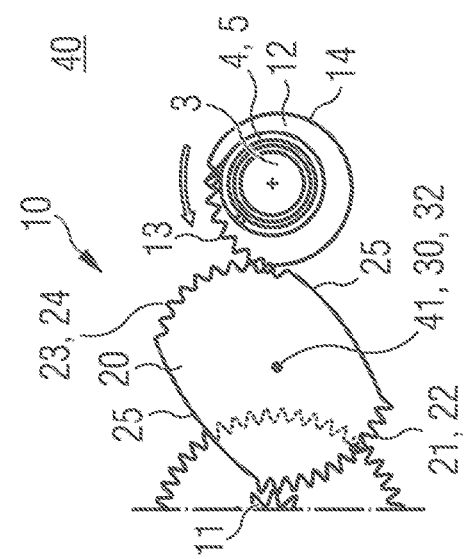

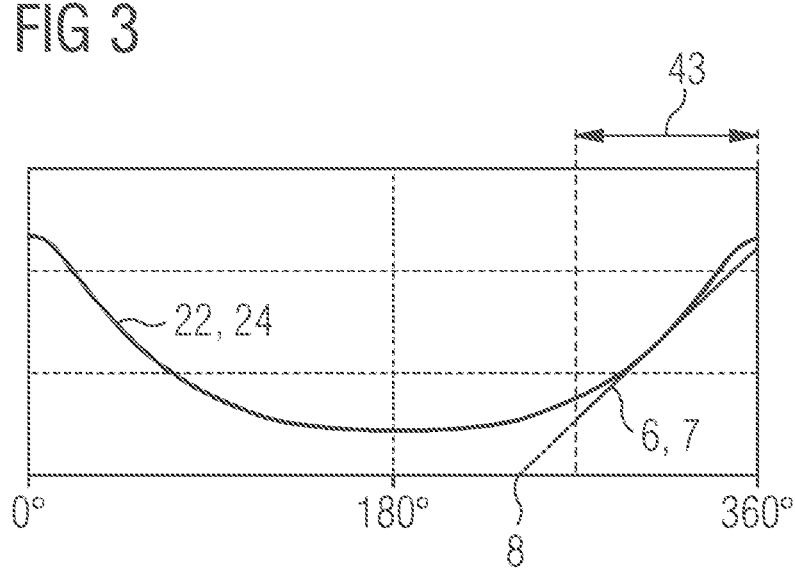

ACTUATOR

CROSS-REFERENCE TO RELATED APPLICATIONS

This application claims priority to EP Application No. 18172183.8 filed May 14, 2018, the contents of which are hereby incorporated by reference in their entirety.

TECHNICAL FIELD

The present disclosure relates to actuators. Various embodiments may include systems and/or methods for operating an actuator in an HVAC system.

BACKGROUND

Actuators can be used for example for actuating or driving a flap or a valve, in particular for heating, ventilation, or air conditioning of a building. The actuator may be used to move an actuating element from a first actuating position into a second actuating position. Both actuating positions can usually also form end stops. Often the first actuating position can be referred to as the start position or rest position, the second actuating position as the actuation position or end position. The actuator may be restored to the start position by means of the pre-tensioned reset spring, as soon as the actuator is in the non-powered state. As has already been stated above, these types of actuator can often be used in systems for heating, ventilation, or cooling in a building. For this reason, it is often a requirement of these types of actuator that they be reliable, durable, low-cost, compact and able to be produced in high volumes.

The German utility model DE 20 2014 102355 U1 describes an actuator which has a cylindrical coil spring on a take-off shaft as a reset spring. The actuator further comprises a gear train with a transmission ratio variable as a function of an actuation angle of the take-off shaft. The gear train in this case has a progressive transmission with a first spirally toothed gear wheel and second spirally toothed gear wheel meshing with the first spirally toothed gear wheel. However, the installation depth of this gear wheel combination is very great.

As already described above, an actuator can be brought into a start or rest position of the actuating element by a reset spring. In some examples, at least one pre-tensioned scroll spring with a plurality of windings may be used as a reset spring to achieve a force progression that is as linear as possible, in other words to achieve a dependency of the reset force provided by the reset spring on a deflection or an angle of rotation of the actuating element that is as low as possible. The plurality of windings means that the scroll spring used in accordance with the prior art has a so-called soft, in particular flat, characteristic curve. The disadvantage here however is that this type of scroll spring with a plurality of windings is mechanically complex and in particular its weight is high.

SUMMARY

Various embodiments may include an actuator having a drive element, a transmission section, and an actuating element, wherein the drive element, for driving the actuating element, has a mechanically active connection to the actuating element through the transmission section, the actuator further having a reset spring which, for providing a closing force acting on the actuating element, has a mechanically active connection to the actuating element. The transmission section has at least one drive gear wheel, a transmission gear wheel and a take-off gear wheel. The transmission gear wheel has a drive gear section and a take-off gear section, wherein the drive gear section makes a meshing engagement with a first transmission function into the drive gear wheel and the take-off gear section makes a meshing engagement with a second transmission function into the take-off gear wheel. The first transmission function and the second transmission function are also different. Actuators incorporating the teachings of the present disclosure may at least partly overcome the previously described disadvantages of actuators in a simple and low-cost manner, with a design that is as compact as possible and/or a restoration force with a force progression that is as linear as possible.

For example, some embodiments include an actuator (1), having a drive element (2), a transmission section (10), and an actuating element (3), wherein the drive element (2), for driving the actuating element (3), has a mechanically active connection to the actuating element (3) through the transmission section (10), the actuator (1) further having a reset spring (4), which has a mechanically active connection to the actuating element (3) for providing a closing force (6) acting on the actuating element (3), wherein the transmission section (10) has at least one drive gear wheel (11), a transmission gear wheel (20) and a take-off gear wheel (12), the transmission gear wheel (20) having a drive gear section (21) and a take-off gear section (23), wherein the drive gear section (21) makes a meshed engagement with a first transmission function (22) into the drive gear wheel (11) and also the take-off gear section (23) makes a meshed engagement with a second transmission function (24) into the take-off gear wheel (12), and wherein the first transmission function (22) and the second transmission function (24) are also different, characterised in that the drive gear wheel (11), the drive gear section (21), the take-off gear section (23) and the take-off gear wheel (12) are arranged in the same active plane (40).

In some embodiments, the reset spring (4) provides a rotation angle-dependent resetting force (7), wherein, to provide a constant or at least essentially constant closing force (6), the drive gear section (21) has a first transmission function (22) and/or the take-off gear section (23) has a second transmission function (24) for at least partly compensating for the rotation angle dependency of the resetting force (7).

In some embodiments, the reset spring (4) is embodied as a coil spring or as a spiral spring (5).

In some embodiments, the transmission gear wheel (20) has at least one spacer section (25) without teeth arranged between the drive gear section (21) and the take-off gear section (23).

In some embodiments, the drive gear section (21) is embodied in the shape of a circle sector and/or the take-off gear section (23) is embodied in the shape of an ellipse segment.

In some embodiments, the drive gear section (21) is embodied in the shape of a circle segment in relation to a centre point of the circle (30), wherein an axis of rotation (41) of the transmission gear wheel (20) goes through the centre point of the circle (30).

In some embodiments, the take-off gear section (23) is embodied in the shape of an ellipse segment in relation to an ellipse centre point (31), wherein the ellipse centre point (31) corresponds to the centre point of the circle (30).

In some embodiments, the take-off gear section (23) is embodied in the shape of an ellipse segment in relation to an ellipse focal point (32), wherein an axis of rotation (41) of the transmission gear wheel (20) goes through this ellipse focal point (32).

In some embodiments, the drive gear section (21) is embodied in the shape of a circle segment in relation to a centre point of the circle (30), wherein the centre point of the circle (30) corresponds to the ellipse focal point (32).

In some embodiments, the take-off gear wheel (12) has a toothed gear section (13) for meshing engagement into the take-off gear section (23) of the transmission gear wheel (20) and a non-toothed free section (14).

In some embodiments, the actuating element (3) is formed at least partly by the take-off gear wheel (12).

Some embodiments include an actuator in which the drive gear wheel, the drive gear section, the take-off gear section, and the take-off gear wheel are arranged in the same active plane.

BRIEF DESCRIPTION OF THE DRAWINGS

Further advantages, features and details of the teachings herein emerge from the description given below, in which exemplary embodiments, which refer to the drawings, are described individually. Elements with the same function and method of operation are each provided with the same reference characters in FIGS. 1 to 3. In the figures, in schematic diagrams:

FIG. 2 shows a second form of embodiment of an actuator incorporating teachings of the present disclosure; and FIG. 3 shows rotation angle dependencies of a transmission function and of a resetting force.

DETAILED DESCRIPTION

Figure 1:
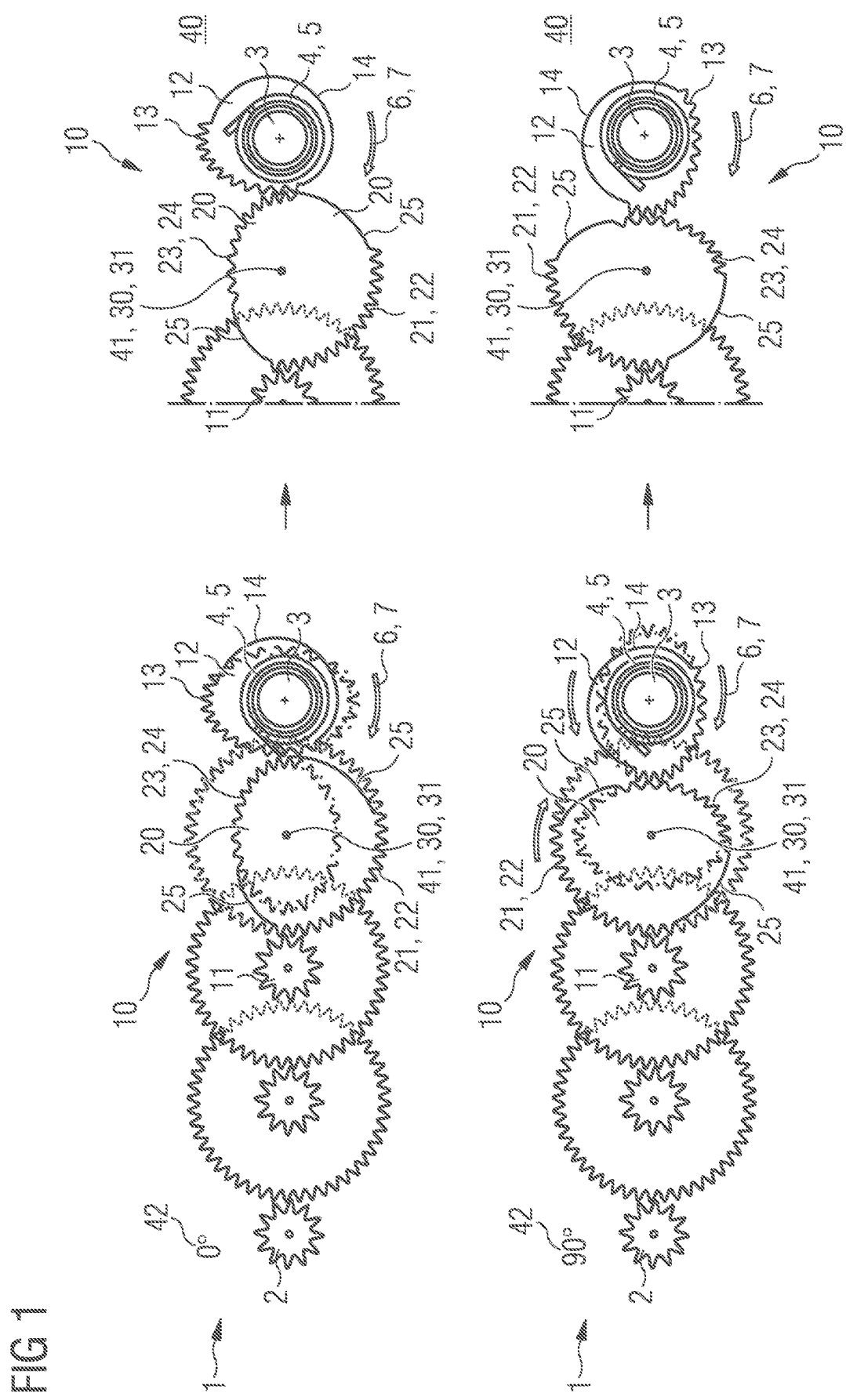
FIG. 1 shows a first form of embodiment of an actuator incorporating teachings of the present disclosure.

An actuator incorporating teachings of the present disclosure can be used for example in systems for heating, ventilating, and/or cooling in a building. For this an example actuator may include a drive element, a transmission section, and an actuating element. The movement of the actuating element is brought about by the drive element, for example an electric motor, a pneumatic, or hydraulic lifting cylinder, wherein the transmission section establishes a mechanically active connection between the drive element and the actuating element. The actuating element in its turn can have a mechanically active connection to a flap or a valve, in order to actuate this flap or this valve. Also, an at least partial integration of the actuating element into a flap or a valve is conceivable.

In some embodiments, the example actuator has a reset spring, through which a closing force acting on the actuating element can be provided. For this purpose, the reset spring has a mechanically active connection to the actuating element. In this way for example the reset spring can be arranged directly on the actuating element, but also for example on a section of the transmission section, through which the transmission section also establishes a mechanically active connection between the reset spring and the actuating element. The transmission section can further be embodied as a geared transmission, e.g. as a reduction transmission. An electric motor rotating at speed as a drive element for example can in this way be translated into a slow movement of the actuating element, but one provided with a high torque.

In some embodiments, the transmission section may be embodied for a specific purpose. The transmission section in particular has a drive gear wheel, a transmission gear wheel, and a take-off gear wheel. The gear wheels, in particular the transmission gear wheel, can be forged, punched, or embodied as an assembly of laminated sheets for example. An additive method, such as for example laser sintering or 3D printing, is also conceivable for producing the gear wheels, in particular the transmission gear wheel.

The three said gear wheels in particular have a mechanically active connection to one another, wherein the drive gear wheel and the transmission gear wheel as well as the transmission gear wheel and the take-off gear wheel each mesh in pairs into one another. For this purpose, the transmission gear wheel in particular has a drive gear section and a take-off gear section. Of importance to the invention is that the drive gear section and the take-off gear section each have a transmission function, wherein these transmission functions of the two gear sections differ.

A transmission function in the sense of this disclosure is understood in particular to be how a transmission ratio of the respective gear section and of the further gear wheel involved changes with an angle of rotation. If for example both gear wheels or gear wheel segments involved are circular in shape, then the transmission ratio is constant in relation to the angle of rotation. With two elliptical gear wheels or gear wheel segments for example, the transmission ratio and thus the transmission function is dependent on the angle of rotation however, so that different transmission ratios are produced for different angles of rotation. Also, further specific adaptations of the transmission functions in particular are conceivable, for example for providing a higher rotational speed for a specific rotation angle range or an explicit increase of a torque, in particular for example at the edges of a rotation angle range used, in order to embody the closing and/or opening of the actuating element especially securely. In other words, the transmission gear wheel of a transmission section of an example actuator is embodied in such a way that it provides two transmission functions, a first transmission function in respect of the active connection to the drive gear wheel and a second transmission function in respect of the active connection to the take-off gear wheel. By making a distinction between these two transmission functions it is possible, through just this one transmission gear wheel, to vary an overall transmission function of the transmission section in a way for which, in accordance with the prior art, at least two separate pairs of gear wheels would be needed. This alone brings a greater compactness of an actuator with it.

In some embodiments, the drive gear wheel, the drive gear section, the take-off gear section and the take-off gear wheel may be located in the same active plane. In other words, a common plane exists, referred to as the active plane in the sense of the invention, in which the drive gear wheel, the transmission gear wheel with its drive gear section and its take-off gear section and the take-off gear wheel are arranged. A further increase in the compactness of an inventive actuator can be provided in this way. Overall an actuator can thus be provided that is especially simple and in particular compact and can thereby be provided with a small space requirement.

In some embodiments, the reset spring provides a restoration force dependent on the angle of rotation, wherein to provide a constant or at least essentially constant closing force, the toothed drive section has a first transmission function and/or the take-off gear section has a second transmission function for at least partly compensating for the rotation angle dependency of the resetting force. Such a rotation-angle-dependent resetting force can in particular mean that the resetting force provided changes markedly with the angle of rotation. This can be the case in particular with reset springs that have a high spring hardness. A disproportionate and in particular markedly rotation-angle-dependent stress on the drive element that a movement of the actuating element must provide against the closing force of the reset spring can be the result.

In order to overcome this at least in part, the first transmission function of the drive gear section and/or the second transmission function of the take-off gear section may be embodied in such a way that, through this likewise rotation-angle-dependent transmission function, the rotation angle dependency of the resetting force can be at least partly compensated for. In this way there can be provision for the movement energy provided by the drive element to have to counteract a now rotation-angle-dependent or at least essentially rotation-angle-dependent closing force, whereby the drive element provided can itself be embodied more simply.

In some embodiments, the reset spring is embodied as a coil spring or as a spiral spring. A coil spring or spiral spring of this type, in particular if only a few windings are present in each case, has an especially high spring hardness. At the same time a coil spring or spiral spring of this type mostly has a high spring hardness, so that a desired closing force can already be provided despite this with a small number of windings. The low number of windings in its turn has the advantage that coil springs or spiral springs of this type, by comparison with the coil springs used in the prior art, can be embodied especially small, light and space-saving. A further reduction of the space required can be provided by this. In some embodiments, the transmission gear wheel has at least one spacer section embodied without teeth arranged between the drive gear section and the take-off gear section. In this way it is possible to separate the drive gear section and the take-off gear section spatially from one another at the circumference of the transmission gear wheel. A crosstalk or an over rotation of the transmission gear wheel to the effect that the drive gear section could be fed to the take-off gear wheel and/or the take-off gear section to the drive gear wheel can be safely avoided in this way.

In some embodiments, the drive gear section may be embodied in the shape of a circle segment and/or for the take-off gear section to be embodied in the shape of an ellipse segment section. A circle segment-shaped drive gear section in particular enables an integration of the transmission gear wheel into the remaining transmission section, e.g. embodied as gearing with circular gear wheels, to be provided. An ellipse segment-shaped take-off gear section for its part represents an especially simple option for providing a rotation-angle-dependent transmission function and thus a compensation for a rotation-angle-dependent resetting force of a reset spring as described above. In particular each transmission function of a circle segment-shaped toothed section is different from a transmission function of an ellipse segment-shaped toothed section.

In some embodiments, the drive gear section may be embodied in a circle segment shape in relation to a centre point of a circle, wherein an axis of rotation of the transmission gear wheel goes through the centre point of the circle. As already described above, an especially simple integration of the transmission gear wheel in a transmission section embodied as gearing can be provided by a circle segment-shaped drive gear section. This can be further supported in particular by an axis of rotation of the transmission gear wheel that goes through the centre point of a circle of this drive gear section embodied in the shape of a circle segment. The transmission gear wheel, at least over that rotation angle range that covers the drive gear section, has the same characteristics and effects as a circular transmission gear wheel, as part of a gearing of the transmission section.

In some embodiments, the take-off gear section may be embodied in an ellipse segment shape in relation to the centre point of an ellipse, wherein the centre point of the ellipse corresponds to the centre point of the circle. In this further development of an inventive actuator, a take-off gear section is now provided as well as the circle segment-shaped drive gear section, which is embodied in the shape of an ellipse segment shape. In particular this ellipse segment-shaped take-off gear section is provided in this case on the transmission gear wheel such that centre point of the ellipse, which corresponds to the ellipse segment of the take-off gear section, coincides with the centre point of the circle, which simultaneously forms the axis of rotation of the transmission gear wheel. This represents a possible embodiment of a transmission section of an actuator incorporating the teachings herein.

In some embodiments, the take-off gear section may be embodied in the shape of an ellipse segment in relation to an ellipse focal point, wherein an axis of rotation of the transmission gear wheel goes through this ellipse focal point. This represents a further option for providing an ellipse segment-shaped take-off gear section on the transmission gear wheel. By contrast with the form of embodiment described above, it is not now the centre point of the ellipse that determines the axis of rotation of the transmission gear wheel, but one of the ellipse focal points. Also, in this way a transmission function can be defined that can be completed by a corresponding take-off gear wheel.

In some embodiments, the drive gear section is embodied in a circle sector shape in relation to the centre point of a circle, wherein the centre point of the circle corresponds to the ellipse focal point. In this form of embodiment, an integration into a transmission section, which is embodied as gearing can be provided especially simply by a drive gear section embodied in a circle sector shape. The fact that the ellipse focal point and the centre point of the circle coincide enables the advantages described above in relation to an axis of rotation through the centre point of the circle also to be provided in this form of embodiment.

In some embodiments, the take-off gear wheel may have a toothed section for meshing engagement into the take-off gear section of the transmission gear and to have a non-toothed free section. In other words, the take-off gear wheel also has an area that remains untoothed. In this way the take-off gear wheel can be embodied more simply and in a more space-saving manner.

In some embodiments, the actuating element may be formed at least partly by the drive gear wheel. Through this integration of the actuating element into the drive gear wheel or an at least partly one-piece or single-part embodiment of the actuating element with the drive gear wheel, a compactness of an inventive actuator can be further increased. An even smaller space requirement can be provided by this.

FIG. 1 shows an example embodiment of an actuator 1 incorporating the teachings of the present disclosure. Shown on the left-hand side of the diagram are two possible angles of rotation (0°, 90°) of the actuating element 3, wherein the illustrations to the right of them each show detailed views, in particular of the transmission gear wheel 20. The actuator 1 shown in particular has a drive element 2, which in this form of embodiment is embodied as an electric motor. A transmission section 10, having in particular gearing embodied as a reduction gear, makes possible a mechanically active connection to an actuating element 3. Likewise, actively connected to the actuating element 3 is a reset spring 4, which in the form of embodiment shown, is embodied as a spiral spring 5.

The transmission section 10 in particular, as well as other toothed gear wheels, has a drive gear wheel 11, a take-off gear wheel 12, and also a transmission gear wheel 20. In the two left-hand diagrams the transmission gear wheel 20 is shown as a solid shape. The transmission gear wheel 20 in particular has a drive gear section 21 and a take-off gear section 23. The drive gear section 21 corresponds in particular with its first transmission function 22 to a circular gear wheel, which is likewise shown as a dashed and dotted outline. The take-off gear section 23 corresponds with its second transmission function 24 to an elliptical gear wheel, which is likewise shown as a dashed and dotted outline. In the right-hand diagrams in each case only the resulting transmission gear wheel 20 is shown.

In the form of embodiment shown in particular the drive gear section 21 and also the take-off gear section 23 are each separated from one another by spacer sections 25, so that a crosstalk of the two toothed sections 21, 23 can be avoided. In the form of embodiment shown in particular the axis of rotation 41 of the transmission gear wheel 20 is further embodied corresponding to the centre point of the circle 30 of the circle segment-shaped drive gear section 21 and also of the centre point of the ellipse 31 of the ellipse segment-shaped take-off gear section 23. The take-off gear wheel 12 is accordingly likewise embodied in an ellipse shape. Moreover, the take-off gear wheel 12 likewise has a toothed section 13 and a free section 14 that is embodied without teeth. The production of a take-off gear wheel 12 can be simplified in this way.

The fact that the first transmission function 22 and the second transmission function 24 are embodied differently enables it in particular to be provided, that the entire transmission function 22, 24 of the transmission section 10 changes solely through the transmission gear wheel 20. In particular in this form of embodiment the second transmission function 24 can be embodied so that a rotation angle-dependent closing force 6 of the spiral spring 5 is compensated for or at least can be essentially compensated for. The drive element 2 in this case must thus only drive against a constant resetting force 7 or closing force 6, through which the drive element 2 can be embodied more simply. It is further indicated on the right-hand side that the drive gear wheel 11, the drive gear section 21 and the take-off gear section 23 of the transmission gear wheel 20 and also the take-off gear wheel 12 are arranged in a common active plane 40. In this way there can also be provision for the entire inventive actuator 1 to be embodied in a more compact manner.

FIG. 2 shows diagrams of a further possible example embodiment of an actuator 1 incorporating teachings of the present disclosure. FIG. 2 now shows the angles of rotation 0°, 30° and 90° of the actuating element 3, wherein for the angle of rotation 90° the resulting transmission gear wheel 20 is also shown in a further diagram on the right. By contrast with the example embodiment shown in FIG. 1, the axis of rotation 41 of the transmission gear wheel 20 is now embodied here corresponding to a centre point of the circle 30 of a circle segment-shaped drive gear section 21 and of an ellipse focal point 32 of an ellipse segment-shaped take-off gear section 23. With regard to further details the reader is referred to the correspondingly analogous elements of the actuator 1 shown in FIG. 1.

FIG. 3 shows both a transmission function 22, 24 and also a closing force 6 or resetting force 7 plotted against an angle of rotation 42. It can clearly be seen that, in the rotation angle range 43 used, the rotation angle-dependent transmission function 22, 24 can be approximated by the rotation angle-dependent closing force 6 or resetting force 7. In other words, a rotation angle-dependent closing force 6 or resetting force 7 can be compensated for or at least essentially compensated for, as shown, by an appropriately selected transmission function 22, 24. In order to obtain an especially good compensation, a pre-tensioning 8 can further be provided for the reset spring 4.

The invention claimed is:

1. An actuator comprising:
a drive element;
a transmission section;
an actuating element;
a mechanically active connection from the drive element to the actuating element through the transmission section; and
a reset spring providing a closing force acting on the actuating element;
wherein the transmission section includes a drive gear wheel, a transmission gear wheel, and a take-off gear wheel;
wherein the transmission gear wheel includes a drive gear section and a take-off gear section;
a first meshed engagement from the drive gear section through a first transmission function into the drive gear wheel; and
a second meshed engagement from the take-off gear section through a second transmission function into the take-off gear wheel;
wherein the first transmission function and the second transmission function are different; and
wherein the drive gear wheel, the drive gear section, the take-off gear section, and the take-off gear wheel are arranged in the same active plane.

2. An actuator according to claim 1, wherein:
the reset spring provides a rotation angle-dependent resetting force;
the drive gear section employs the first transmission function to at least partially compensate for the rotation angle dependency of the resetting force.

3. An actuator according to claim 2, wherein the reset spring comprises a coil spring or a spiral spring.

4. An actuator according to claim 1, wherein the transmission gear wheel includes a spacer section without teeth disposed between the drive gear section and the take-off gear section.

5. An actuator according to claim 1, wherein the drive gear section comprises a circle sector.

6. An actuator according to claim 1, wherein:
the drive gear section comprises a circle segment in relation to a centre point of the circle; and
an axis of rotation of the transmission gear wheel goes through the centre point of the circle.

7. An actuator according to claim 6, wherein the take-off gear section comprises an ellipse segment in relation to an ellipse centre point; and
the ellipse centre point corresponds to the centre point of the circle.

8. An actuator according to claim 1, wherein:
the take-off gear section comprises an ellipse segment in relation to an ellipse focal point; and
an axis of rotation of the transmission gear wheel goes through this ellipse focal point.

9. An actuator according to claim 8, wherein:
the drive gear section comprises a circle segment in relation to a centre point of the circle; and
the centre point of the circle corresponds to the ellipse focal point.

10. An actuator according to claim 1, wherein the take-off gear wheel includes a toothed gear section for meshing engagement into the take-off gear section of the transmission gear wheel and a non-toothed free section.

11. An actuator according to claim 1, wherein the actuating element is formed at least partly by the take-off gear wheel.

12. An actuator according to claim 1, wherein:
the reset spring provides a rotation angle-dependent resetting force; and
the take-off gear section employs the second transmission function to at least partially compensate for the rotation angle dependency of the resetting force.

13. An actuator according to claim 1, wherein the take-off gear section comprises an ellipse segment.

* * * * *